(12) United States Patent
Harper et al.

(10) Patent No.: US 11,371,706 B2
(45) Date of Patent: Jun. 28, 2022

(54) PREMIXED PILOT NOZZLE FOR GAS TURBINE COMBUSTOR

(71) Applicant: General Electric Company, Schenectady, NY (US)

(72) Inventors: James Harper, Greenville, SC (US); Neal William Grooms, Simpsonville, SC (US); Yon Han Chong, Greer, SC (US); Benjamin Robert Ryan, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 15/845,338

(22) Filed: Dec. 18, 2017

(65) Prior Publication Data

US 2019/0186749 A1    Jun. 20, 2019

(51) Int. Cl.
*F23R 3/28* (2006.01)
*F23R 3/34* (2006.01)
*F02C 3/30* (2006.01)
*F23D 14/58* (2006.01)
*F23R 3/36* (2006.01)
*F23D 11/38* (2006.01)
(Continued)

(52) U.S. Cl.
CPC ............... *F23R 3/286* (2013.01); *F02C 3/30* (2013.01); *F23D 11/383* (2013.01); *F23D 11/40* (2013.01); *F23D 14/58* (2013.01); *F23D 17/002* (2013.01); *F23R 3/283* (2013.01); *F23R 3/343* (2013.01); *F23R 3/36* (2013.01); *F05D 2240/35* (2013.01); *F05D 2260/212* (2013.01); *F23R 2900/00004* (2013.01)

(58) Field of Classification Search
CPC ...... F23R 3/02; F23R 3/06; F23R 3/34; F23R 3/343; F23R 3/346; F23R 3/54; F23R 2900/00014; F23R 2900/00015; F02C 7/228; F02C 3/145
See application file for complete search history.

(56) References Cited

U.S. PATENT DOCUMENTS 5,660,039 A * 8/1997 Sion ..................... B01F 5/0453
                                                    239/424
6,065,961 A    5/2000 Shaffer et al.
(Continued)

FOREIGN PATENT DOCUMENTS

WO    WO-2015152760 A1 * 10/2015 .............. F23D 11/16

*Primary Examiner* — Scott J Walthour
*Assistant Examiner* — David P. Olynick
(74) *Attorney, Agent, or Firm* — Dority & Manning, P.A.

(57) ABSTRACT

The premixed pilot nozzle includes axially elongated tubes defined within a plenum between an outer shroud and a first shroud disposed radially inward of the outer shroud. The tubes extend between tube inlets defined through a forward face and tube outlets defined through an aft face. A second shroud is disposed radially inward of the first shroud, thereby defining a fuel plenum between the first shroud and the second shroud, and the fuel plenum is in communication with a gaseous fuel supply. A fuel injection port, which is positioned between the tube inlet and the tube outlet of each tube, is in fluid communication with the fuel plenum. An air supply configured to fluidly communicate with the tube inlet of each tube. The second shroud defines a second plenum therein, the second plenum being coupled to a source of a non-combustible fluid.

19 Claims, 8 Drawing Sheets (51) Int. Cl.
  *F23D 11/40*    (2006.01)
  *F23D 17/00*    (2006.01)

(56) References Cited

U.S. PATENT DOCUMENTS

| | | |
|---|---|---|
| 6,438,961 B2 | 8/2002 | Tuthill et al. |
| 6,446,439 B1 | 9/2002 | Kraft et al. |
| 6,622,488 B2 | 9/2003 | Mansour et al. |
| 7,854,121 B2 | 12/2010 | Vandale et al. |
| 8,146,365 B2 * | 4/2012 | Shum .................... F23D 11/108 60/740 |
| 8,281,595 B2 | 10/2012 | Davis, Jr. et al. |
| 8,468,831 B2 | 6/2013 | Venkataraman et al. |
| 8,677,760 B2 | 3/2014 | Khan et al. |
| 8,919,673 B2 | 12/2014 | Subramanian et al. |
| 9,297,535 B2 | 3/2016 | Uhm et al. |
| 9,435,540 B2 | 9/2016 | Berry et al. |
| 9,518,742 B2 * | 12/2016 | York ........................ F23D 14/64 |
| 9,714,767 B2 | 7/2017 | Stewart et al. |
| 9,803,867 B2 | 10/2017 | Stewart |
| 2004/0006989 A1 * | 1/2004 | Stuttaford ............... F23R 3/286 60/776 |
| 2005/0144952 A1 * | 7/2005 | Prociw .................. F23D 11/105 60/740 |
| 2009/0158743 A1 * | 6/2009 | Francis ................... F02C 7/222 60/748 |
| 2009/0165436 A1 | 7/2009 | Herbon et al. |
| 2011/0162371 A1 * | 7/2011 | Khan ..................... F23R 3/286 60/737 |
| 2013/0219899 A1 | 8/2013 | Uhm et al. |
| 2014/0238025 A1 | 8/2014 | Uhm et al. |
| 2015/0159875 A1 * | 6/2015 | Berry ..................... F23R 3/286 60/737 |
| 2015/0253011 A1 | 9/2015 | Uhm et al. |
| 2016/0146459 A1 | 5/2016 | Gibson et al. |
| 2016/0146460 A1 * | 5/2016 | Stewart ..................... F23R 3/14 60/737 |
| 2016/0186662 A1 | 6/2016 | Stewart |
| 2016/0186663 A1 | 6/2016 | Stewart et al. |
| 2016/0290651 A1 * | 10/2016 | Donovan ................ F23R 3/286 |
| 2016/0305668 A1 * | 10/2016 | Romig ................... F23R 3/286 |
| 2017/0146235 A1 * | 5/2017 | Marchal ................. F23R 3/283 |
| 2017/0191457 A1 * | 7/2017 | Spivey ................... F23R 3/286 |

* cited by examiner

PREMIXED PILOT NOZZLE FOR GAS TURBINE COMBUSTOR

TECHNICAL FIELD

The present disclosure relates to gas turbine engines that combust fuel with air to generate a high-temperature gas stream that drives turbine blades to rotate a shaft to which the turbine blades are attached. More specifically, the present disclosure is directed to a fuel nozzle for a gas turbine combustor that premixes fuel with air as a pilot fuel/air mixture to reduce emissions of nitrogen oxides.

BACKGROUND

Gas turbine engines are widely used to generate power for numerous applications. A convention gas turbine engine includes a compressor, a combustor, and a turbine. The compressor provides compressed air to the combustor. The air entering the combustor is mixed with fuel and combusted. The hot gases of combustion (i.e., the combustion products) are exhausted from the combustor and flow into the blades of the turbine, causing rotation of the shaft to which the turbine blades are connected. Some of the mechanical energy of the rotating shaft drives the compressor and/or other mechanical systems.

A gas turbine engine may employ one or more fuel nozzles to direct fuel and air into the combustor liner for burning in a combustion zone. The fuel nozzles may be arranged in a headend of the combustor and may be configured to intake a compressed air flow to be mixed with fuel. Diffusion flames result when fuel and air are delivered through the fuel nozzle in separate streams and mixed in the combustion zone, where the fuel and air are burned to produce the combustion products. Premixed flames result when fuel and air are mixed within the fuel nozzle, upstream of the combustion zone, and a mixture of fuel and air is introduced into the combustion zone and burned to produce the combustion products.

To reduce nitrogen oxides (NOx) emissions below government-mandated permissible levels, many gas turbine manufacturers moved away from diffusion flames to a fully premixed operations mode, in which lean fuel and air mixtures are burned. Fuel-air mixing affects both the levels of NOx generated in the combustion products and the gas turbine's performance.

Typically, an exemplary pre-mixing fuel nozzle may be internally supported by a center body disposed along a longitudinal axis of the fuel nozzle, and a pilot fuel nozzle tip may be mounted at the end of the center body proximate to the combustion zone. In some cases, swirling vanes are mounted to the center body upstream of the pilot fuel nozzle tip and extend radially outward of the center body to produce a so-called "swozzle," as described in U.S. Pat. No. 6,438,961. The swozzle has curved vanes that extend through an annular flow passage between the center body and an outer burner tube. The vanes introduce fuel into the annular flow passage, where the fuel is entrained with air that is swirled as the air flows between the vanes.

In other instances, the pre-mixing fuel nozzle may have generally cylindrical injection pegs, instead of swirl vanes, arranged circumferentially about the center body upstream of the pilot fuel nozzle tip. The injection pegs extend radially outward of the center body and inject fuel into a flow of air passing between the injection pegs.

It is known that higher gas temperatures in the combustion zone correlate with greater quantities of NOx produced. To lower the combustion gas temperatures, operators have premixed the fuel and air entering the combustor and/or reduced the ratio of fuel to air that is consumed. At some point, however, the ratio of fuel to air may become too lean to sustain combustion, and there is a tendency for the flame of the fuel nozzle to blow out and thus render unstable the operation of the gas turbine engine. Historically, a diffusion-type pilot flame has been used to stabilize the flame in the combustor, although with an increase in NOx associated with such diffusion flames.

More recently, efforts have been made to introduced a premixed pilot flame to stabilize the main flame in the combustor. However, there remains a need for improved premixed pilot assemblies that offer flame stabilization benefits, while also minimizing the production of NOx emissions generally associated with pilot nozzles.

SUMMARY

The present disclosure is directed to a premixed pilot nozzle for a gas turbine combustor. The premixed pilot nozzle includes axially elongated tubes defined within a plenum between an outer shroud and a first shroud disposed radially inward of the outer shroud, each of the tubes extending between a tube inlet defined through a forward face of the premixed pilot nozzle and a tube outlet defined through an aft face of the premixed pilot nozzle. A second shroud is disposed radially inward of the first shroud, such that a fuel plenum is defined between the first shroud and the second shroud, and the fuel plenum is in communication with a gaseous fuel supply. A fuel injection port, which is positioned between the tube inlet and the tube outlet of each of the tubes, is in fluid communication with the fuel plenum. An air supply configured to fluidly communicate with the tube inlet of each of the tubes. The second shroud defines a second plenum therein, the second plenum being coupled to a source of a non-combustible fluid.

In a first embodiment, the non-combustible fluid is air, and the second shroud includes a dummy cartridge insert therein. In a second embodiment, the non-combustible fluid is water, and the second shroud surrounds a liquid fuel cartridge for delivering liquid fuel through the aft face of the premixed pilot nozzle.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which.

DETAILED DESCRIPTION

Aspects and advantages of the present premixed pilot nozzles are set forth below in the following description, or may be obvious from the description, or may be learned through practice of the invention. Reference will now be made in detail to present embodiments of the premixed pilot nozzles, one or more examples of which are illustrated in the accompanying drawings. The detailed description uses numerical designations to refer to features in the drawings. Like or similar designations in the drawings and description may be used to refer to like or similar parts.

As will be appreciated, each example is provided by way of explanation of the invention, not limitation of the invention. In fact, it will be apparent to those skilled in the art that modifications and variations can be made in the present fuel nozzles without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. It is to be understood that the ranges and limits mentioned herein include all sub-ranges located within the prescribed limits, inclusive of the limits themselves unless otherwise stated.

To clearly describe the present premixed pilot fuel nozzle, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine, and "aft" being used to describe components located toward the rearward (or turbine) end of the engine. Additionally, the terms "leading" and "trailing" may be used and/or understood as being similar in description as the terms "forward" and "aft," respectively. "Leading" may be used to describe, for example, a surface of a turbine blade over which a fluid initially flows, and "trailing" may be used to describe a surface of the turbine blade over which the fluid finally flows.

Figure 1:
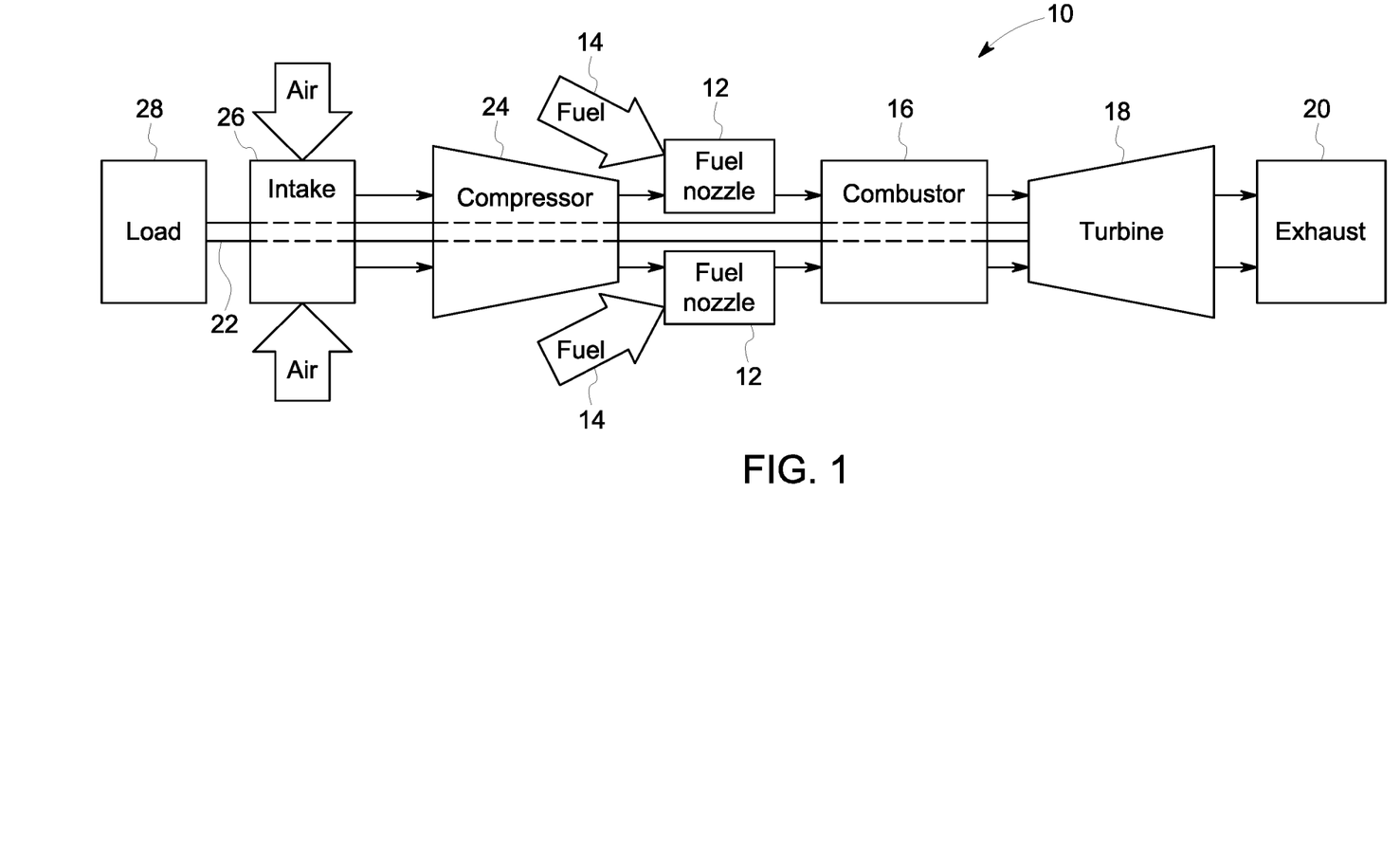
FIG. 1 is a block diagram of an exemplary gas turbine in which the present fuel nozzles may be used.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position or direction of objects along an axis "R", which is substantially perpendicular with axis A and intersects axis A at only one location. Finally, the term "circumferential" refers to movement or position around axis A (e.g., axis "C"). The term "circumferential" may refer to a dimension extending around a center of any suitable shape (e.g., a polygon) and is not limited to a dimension extending around a center of a circular shape.

FIG. 1 schematically illustrates an exemplary gas turbine system 10. The turbine system 10 may use liquid or gaseous fuel, such as natural gas and/or synthetic gas, to run the turbine system 10. As depicted, each combustor 16 has one or more fuel nozzles 12 of the type described more fully below, which receive fuel from a fuel supply 14, mix the fuel with an air supply from the compressor 24, and direct the fuel-air mixture into the combustor 16 for combusting. The combusted fuel-air mixture creates hot pressurized exhaust gases that may be directed through a turbine 18 toward an exhaust outlet 20.

As the exhaust gases pass through the turbine 18, the gases force one or more turbine blades connected to a shaft 22 to rotate the shaft 22 along an axis of the turbine system 10. As illustrated, the shaft 22 may be connected to various components of the turbine system 10, including a compressor 24. The compressor 24 also includes blades that may be coupled to the shaft 22. As the shaft 22 rotates, the blades within the compressor 24 also rotate, thereby compressing air from an air intake 26 through the compressor 24 and into the fuel nozzles 12 and/or combustor 16.

The shaft 22 also may be connected to a load 28, which may be a vehicle or a stationary load, such as an electrical generator in a power plant or a propeller on an aircraft, for example. As will be understood, the load 28 may include any suitable device capable of being powered by the rotational output of turbine system 10. The load 28 may be located upstream of the compressor 24, as shown, or may be located downstream of the turbine 18.

Figure 2:
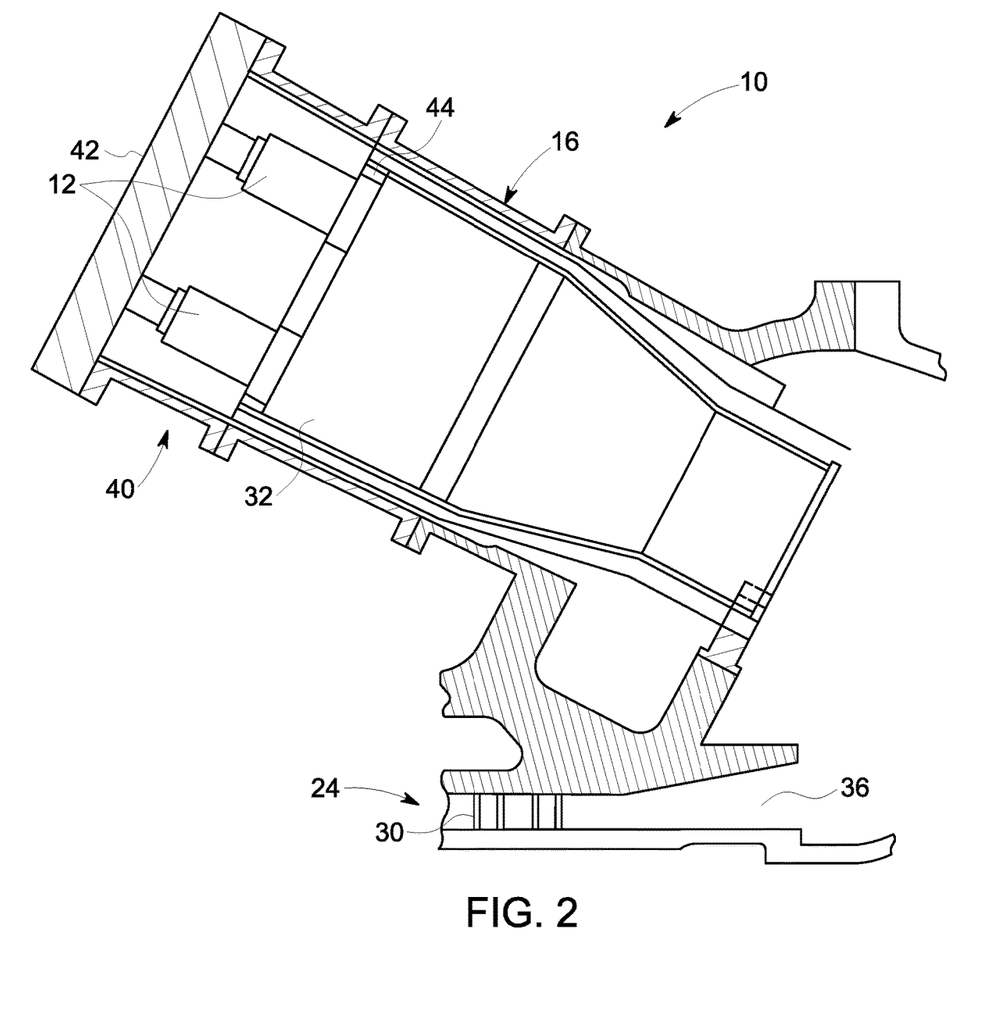
FIG. 2 is a cross-sectional view of an exemplary combustor, which may be used in the gas turbine illustrated in FIG. 1 and which may contain the present fuel nozzles.

FIG. 2 is a simplified cross-sectional view of several portions of the gas turbine system 10 schematically depicted in FIG. 1. As shown in FIG. 2, the turbine system 10 includes one or more fuel nozzles 12 located in a headend 40 of the combustor 16 in the gas turbine engine 10. The headend 40 of the combustor 16 may include an end cover 42 and a cap assembly 44, and the fuel nozzles 12 may extend between the end cover 42 and the cap assembly 44. Although one two fuel nozzles 12 are illustrated, the headend 40 may include more fuel nozzles 12, including arrangements in which one fuel nozzle is disposed in the center of the headend 27 and is surrounded by a plurality of other fuel nozzles. Nozzles with the present premixed pilot tips 100, 200 are well-suited for use as the center fuel nozzle of the headend 40.

As described above, the system 10 includes a compressor section 24 for pressurizing a gas, such as air, flowing into the system 10 via air intake 26 (shown in FIG. 1). In operation, air enters the turbine system 10 through the air intake 26 and may be pressurized in the compressor 24. It should be understood that, while the gas may be referred to herein as air, the gas may be any gas suitable for use in a gas turbine system 10.

Pressurized air discharged from the compressor section 24 flows into each combustor 16 through a compressor discharge casing 34 that at least partially surrounds the combustor 16. The combustor section of the gas turbine system 10 is generally characterized by a plurality of combustors 16 (only one of which is illustrated in FIGS. 1 and 2) disposed in an annular array about an axis of the system 10. The air entering each combustor 16 is mixed with fuel and combusted within a combustion chamber defined by a liner 32 of the combustor 16.

For example, the fuel nozzles 12 may inject a fuel-air mixture into the combustor 16 in a suitable fuel-air ratio for optimal combustion, emissions, fuel consumption, and power output. The combustion generates hot pressurized exhaust gases, which then flow from each combustor 16 to a turbine section 18 (FIG. 1) to drive the system 10 and generate power. The hot gases drive one or more blades (not shown) within the turbine 18 to rotate the shaft 22 and, thus, the compressor 24 and the load 28. The rotation of the shaft 22 causes blades 30 within the compressor 24 to rotate and draw in and pressurize the air received by the intake 26. It readily should be appreciated, however, that a combustor 16 need not be configured as described above and illustrated herein and, in general, may have any configuration that permits pressurized air to be mixed with fuel, combusted and transferred to a turbine section 18 of the system 10.

FIGS. 3 through 8 illustrate an exemplary configuration of the fuel nozzle 12 with a premixed pilot tip 100 or 200 (hereinafter, a "premixed pilot nozzle"), in accordance with certain aspects of the present disclosure.

Figure 3:
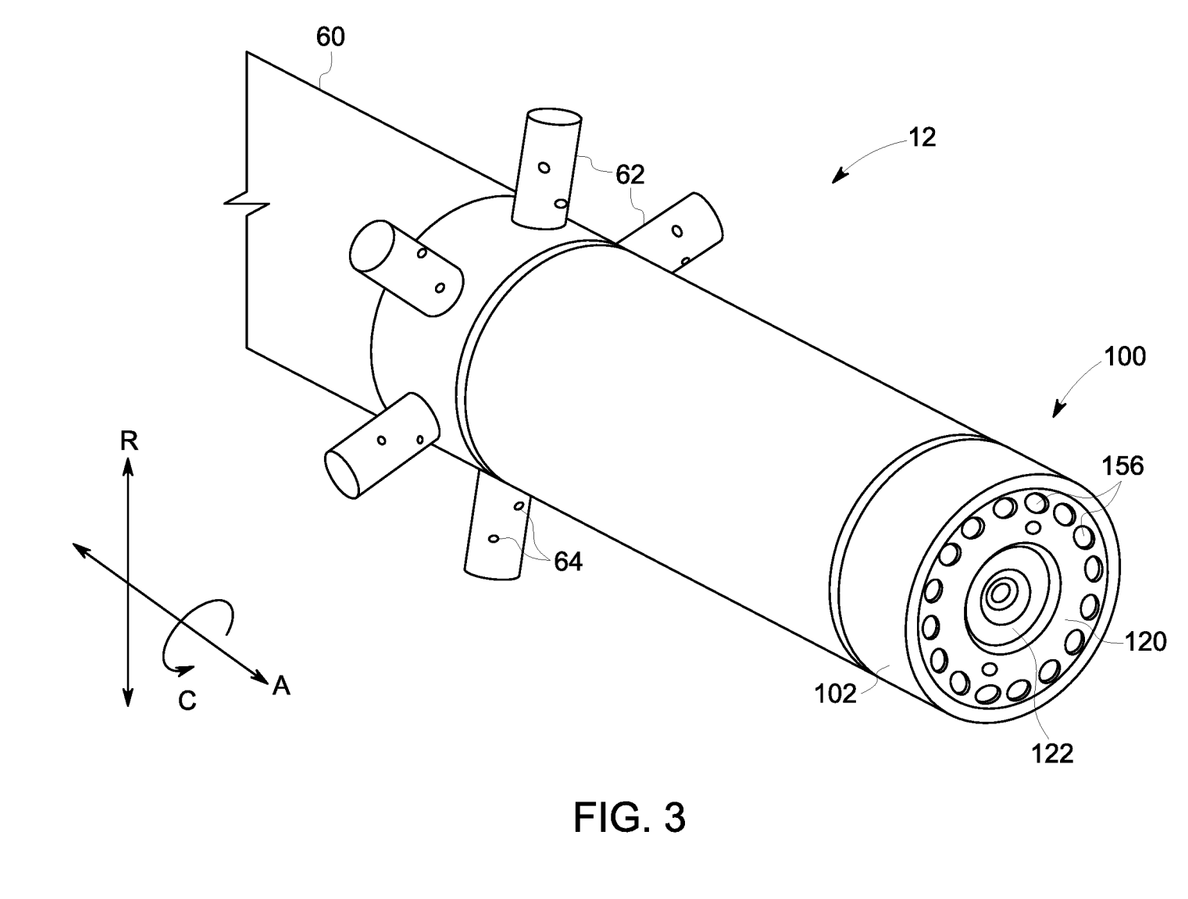
FIG. 3 is a perspective view of a portion of a fuel nozzle, as described herein.

As shown in FIG. 3, the premixed pilot nozzle 12 includes a center body 60 and a premixed pilot tip 100 that is disposed at a downstream end of the center body 60 (i.e., proximate to the combustion chamber). Fuel injection pegs 62 are disposed circumferentially around the center body 60 and may extend radially from the center body 60. Each of the fuel injection pegs 62 includes one or more fuel injection ports 64 that deliver the main fuel supply to the combustor 16. The center body 60 may be surrounded along at least a portion of its longitudinal axis by a burner tube (not shown), such that air traveling through the burner tube passes between the fuel injection pegs 62 and mixes with fuel from the fuel injection ports 64, as the fuel and air travel through the burner tube to the combustion chamber (downstream of the premixed pilot tip 100).

The premixed pilot tip 100 includes an outer shroud 102 and an aft face 120 through which a plurality of tube outlets 156 is disposed. The tube outlets 156 are positioned around a perimeter of the aft face 120, as will be discussed further below. Other features and aspects of the premixed pilot tip 100 are described further below, with reference to the remaining Figures.

Figure 4:
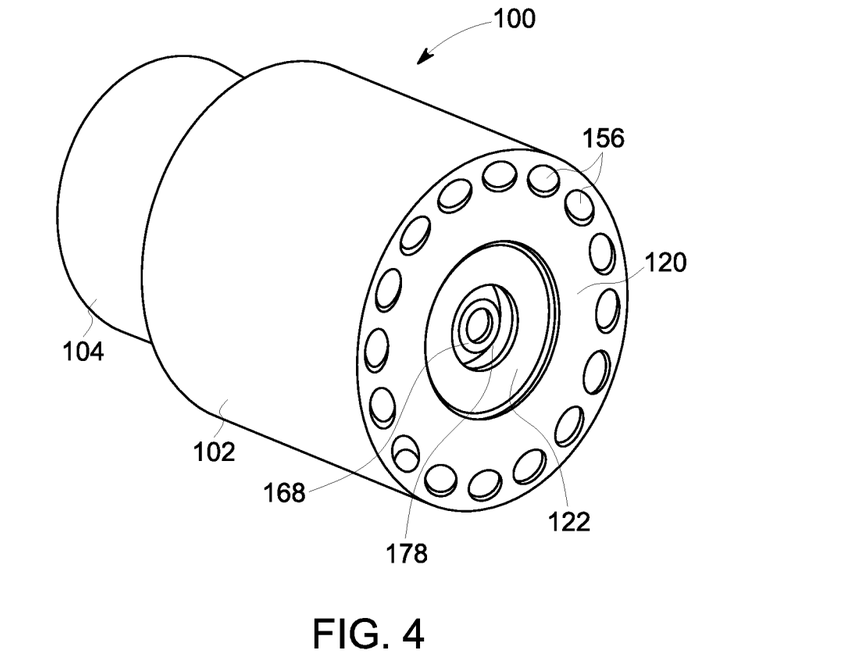
FIG. 4 is a perspective view of a premixed pilot tip assembly of the fuel nozzle of FIG. 3, according to the present disclosure, when viewed from a downstream position looking upstream.
Figure 5:
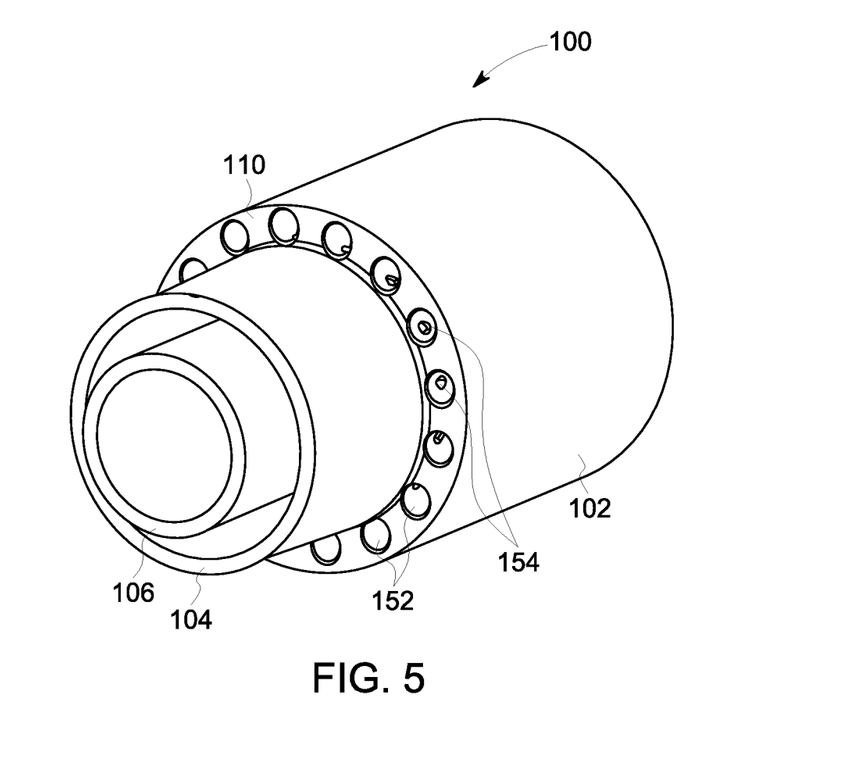
FIG. 5 is a perspective view of the premixed pilot tip assembly of FIG. 4, when viewed from an upstream position looking downstream.

FIGS. 4 and 5 illustrate the premixed pilot tip 100 as viewed, respectively, from downstream of the pilot tip 100 looking upstream (also known as "aft-looking-forward") and from upstream of the pilot tip 100 looking downstream (also known as "forward-looking-aft"). The premixed pilot tip 100 includes an outer shroud 102 that defines an outermost surface of the premixed pilot tip 100. The aft face 120 defines the surface proximate to the combustion chamber and may include a recessed area 122 radially inward of the tube outlets 156 that promotes flame stabilization and keeps the aft face 120 cool. The premixed pilot tip 100 further includes an intermediate shroud 104 and an inner shroud 106, as shown in FIG. 5. The outer shroud 102, the intermediate shroud 104, and the inner shroud 106 are disposed in a concentric relationship and share a common longitudinal axis through their respective centers. The inner shroud 106 is in fluid communication with a source of non-combustible fluid, such as air or water, as discussed below.

FIG. 5 further illustrates a forward face 110 of the premixed pilot tip 100 through which a plurality of tube inlets 152 is disposed. The tube inlets 152 are positioned around a perimeter of the forward face 110. Each tube inlet 152 on the forward face 110 has a respective tube outlet 156 on the aft face 120, which is circumferentially offset from the tube inlet 152. In other words, each tube 150 (shown in FIGS. 6-8) is not linear, but rather includes helical portions 158 that turn the flow of fluid exiting from the tube 150.

Figure 6:
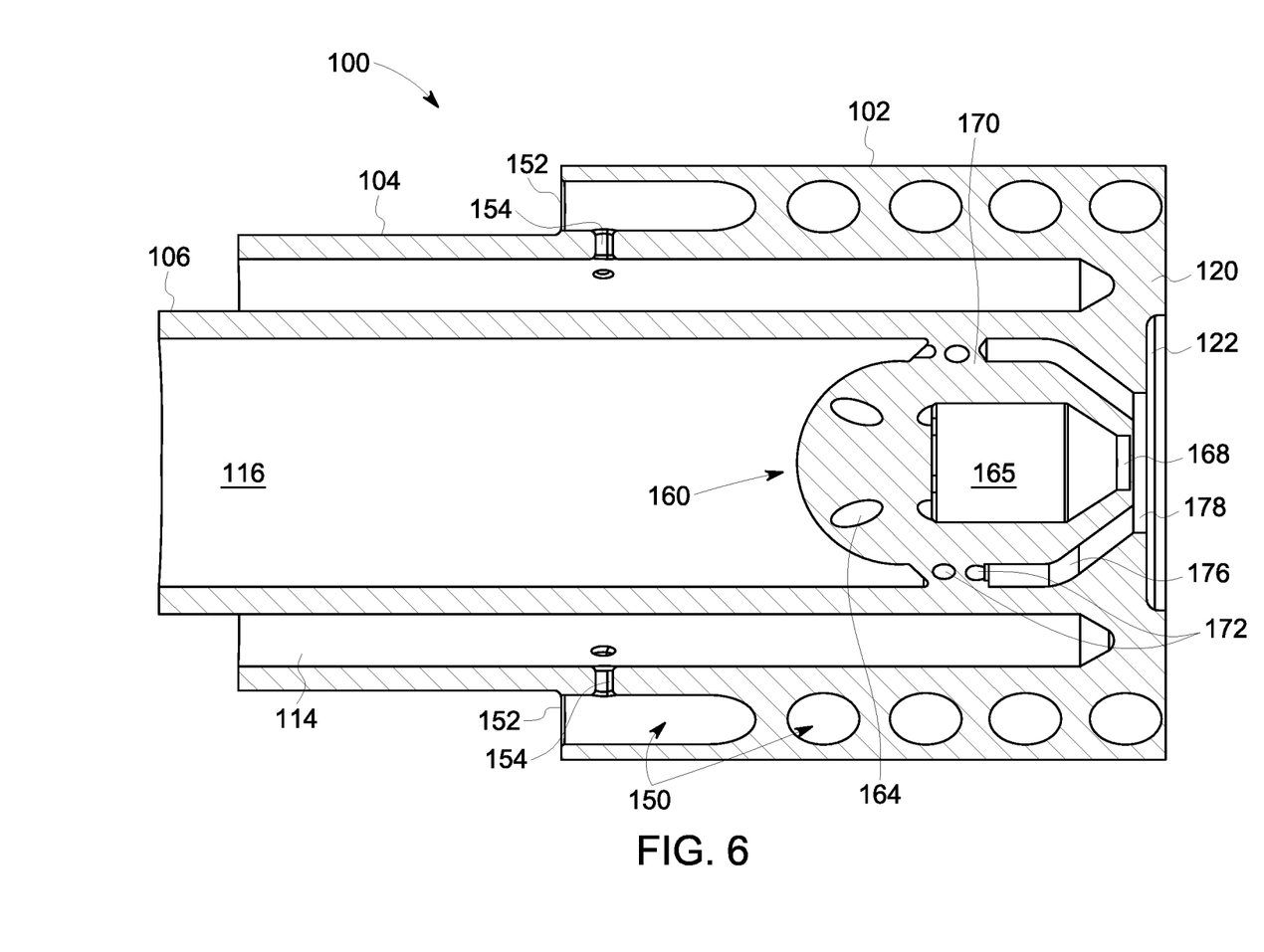
FIG. 6 is a cross-sectional side view of the premixed pilot tip assembly of FIG. 4.
Figure 7:
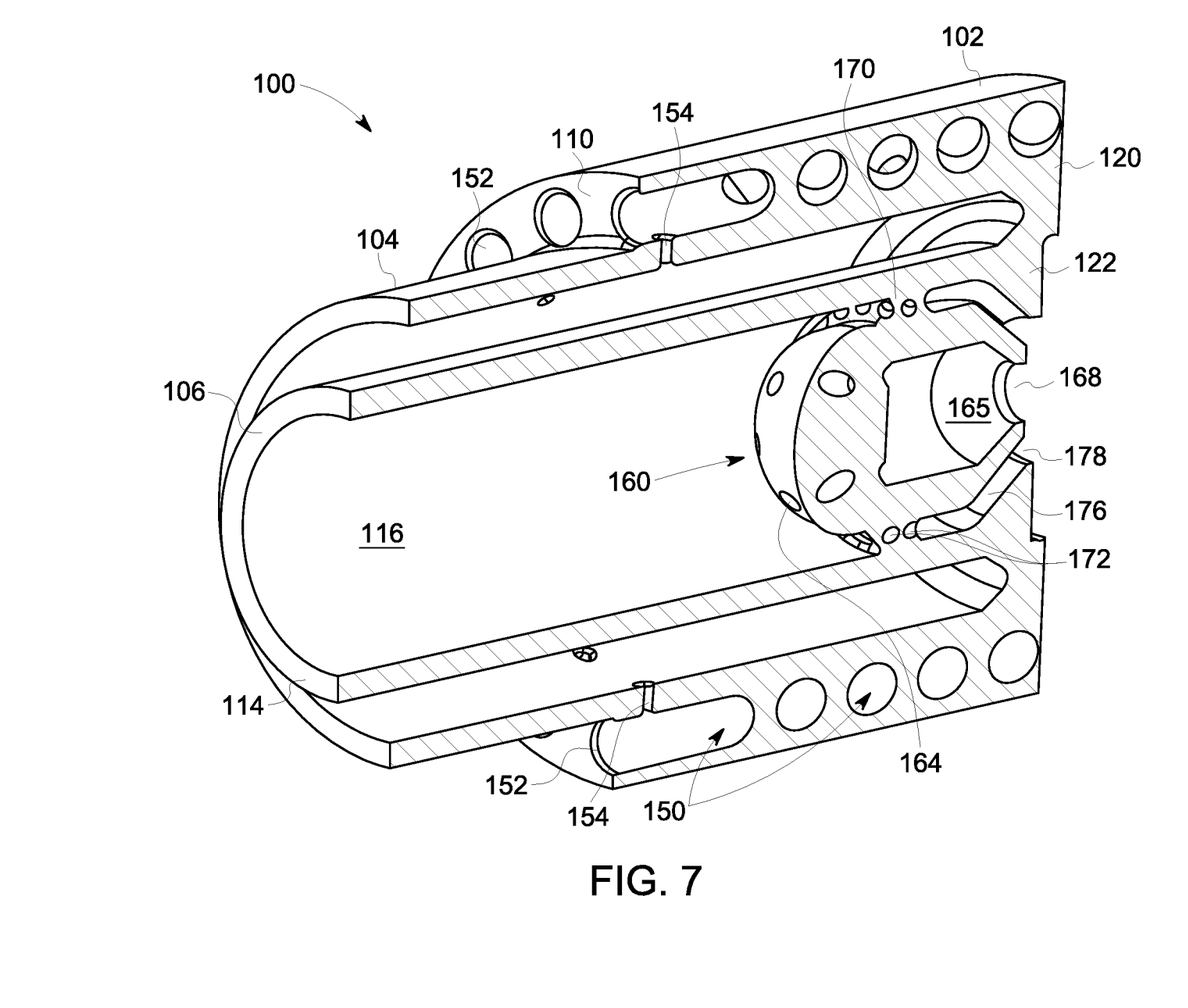
FIG. 7 is a cross-sectional perspective view of the premixed pilot tip assembly of FIG. 4, when viewed from an upstream position looking downstream.
Figure 8:
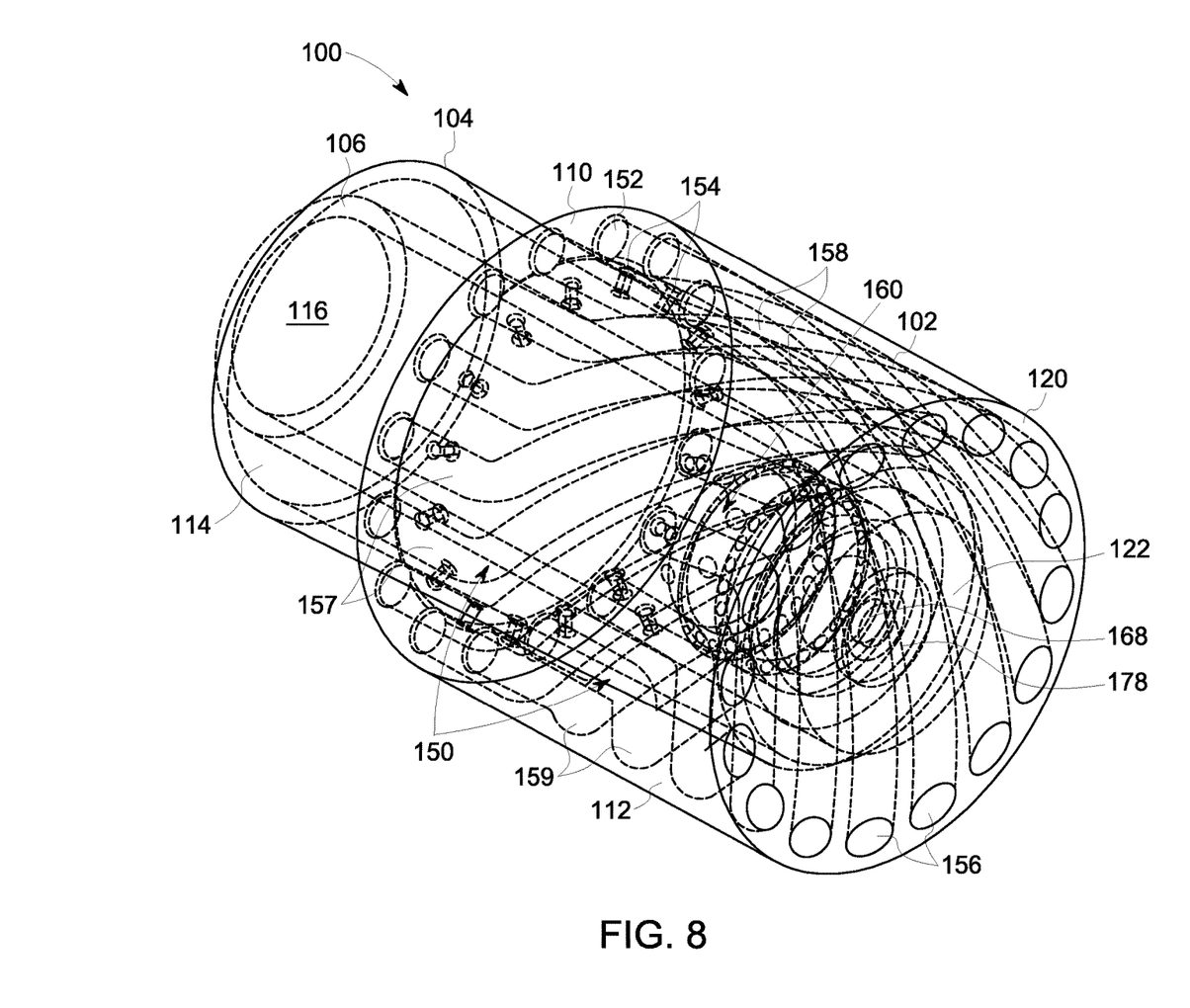
FIG. 8 is a perspective view of the premixed pilot tip assembly of FIG. 4, which illustrates the internal features of the premixed pilot tip assembly.

FIGS. 6, 7, and 8 further illustrate the interior of the premixed pilot tip 100. An air plenum 112 is defined between the outer shroud 102 and the intermediate shroud 104, and a plurality of tubes 150 extend through the air plenum 112 between the forward face 110 and the aft face 120. A gaseous fuel plenum 114, which is defined between the intermediate shroud 104 and the inner shroud 106, extends along the axial length of the premixed pilot tip 100 to the aft face 120 to remove excess heat from the aft face 120.

Fuel from the fuel plenum 114 flows through fuel injection ports 154 defined through the intermediate shroud 104 and into the forward ends of the tubes 150, where the fuel is entrained with air entering through the tube inlets 152. The fuel and air are conveyed through the tubes 150, where the helical portions 158 (best seen in FIG. 8) increase the mixing length available to provide a well-mixed fuel-air mixture at the tube outlets 156, while maintaining a relatively short axial length for the premixed pilot tip 100. The helical portions 158 also promote mixing by reducing the likelihood of stagnation zones along the tube walls.

In those instances when the fuel nozzle 12 having the premixed pilot tip 100 is used for gas-only operation, the inner shroud 106 defines an air plenum 116. The inner shroud 106 includes a dummy cartridge insert 160, whose aft shape mirrors that of a liquid cartridge tip 260 (shown in FIG. 9). The dummy cartridge insert 160 includes a bulbous body 162 through which air holes 164 are defined and an inner cavity 165 in fluid communication with the air holes 164. The aft end of the dummy cartridge insert 160 has a hollow conical portion 166 that is in fluid communication with the inner cavity 165 and that terminates in an air outlet 168. The air outlet 168 is located axially upstream of the tube outlets 156 and is in fluid communication with the air cavity 165.

The dummy cartridge insert 160 is disposed at the aft end of the inner shroud 106 and is held in position by a perimeter band 170 through which a plurality of apertures 172 are formed. Air from the air plenum 116 flows through the apertures 172 in the perimeter band 170 and exits the region 176 downstream of the perimeter band 170 via an annulus 178, which is disposed in an axial plane between the air outlet 168 and the tube outlets 156.

FIG. 8 illustrates the tubes 150 that are positioned around the perimeter of the premixed pilot tip 100. Each tube 150 includes an inlet 152 that leads to a straight tube portion 157 into which the fuel injection port 154 is directed. The straight tube portion 157 is seamlessly coupled to curved portion 159 that leads to a helical segment 159. The helical portion 159 causes the fuel/air mixture to be discharged from the tube outlets 156 at a tangential angle relative to a longitudinal axis of the premixed pilot tip 100. As may be observed, the tube outlets 156 have an elliptical shape due to the angle at which the helical segments 159 of the tubes 150 intersect the aft face 120. It should be noted that tubes having a uniform cross-sectional diameter and being oriented in parallel to the longitudinal axis result in tube outlets having a circular shape.

Additionally, while each tube 150 is illustrated as having a single fuel injection port 154, it should be understood that more than one fuel port may be provided for each tube 150 (including fuel ports in different axial planes). Moreover, while the fuel ports 154 of each tube 150 are illustrated as residing in a common axial plane, the present premixed fuel nozzle tip is not limited to such an arrangement. Rather, the fuel ports 154 may be disposed in two or more axial planes, as desired, for example, to mitigate combustion dynamics.

Figure 9:
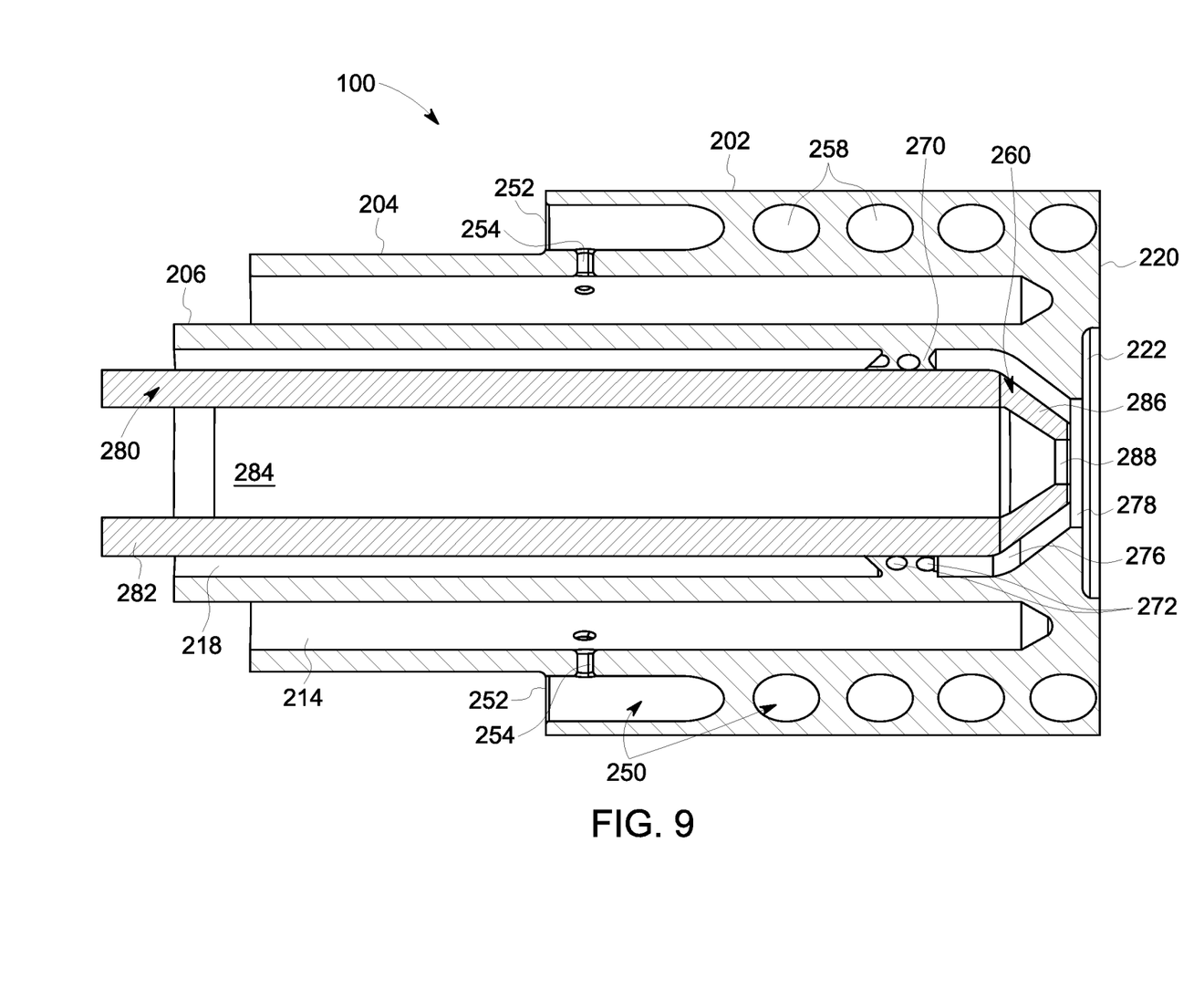
FIG. 9 is a cross-sectional side view of a premixed pilot tip assembly, in which a liquid fuel cartridge is installed.

FIG. 9 illustrates the premixed pilot tip 200 as configured to deliver both gaseous pilot fuel and liquid fuel. The portion of the premixed pilot tip 200 that delivers the pilot fuel is the same as the assembly shown in FIGS. 3 through 8. Specifically, the premixed pilot tip 200 includes, in a concentric arrangement, an outer shroud 202, an intermediate shroud 204 disposed radially inward of the outer shroud 202, an inner shroud 206 disposed radially inward of the intermediate shroud 204, and a liquid fuel cartridge 280 disposed radially inward of the inner shroud 206. The inner shroud 206 is in fluid communication with a source of non-combustible fluid, which in this case is water.

A gaseous fuel plenum 214, which is defined between the intermediate shroud 204 and the inner shroud 206, extends along the axial length of the premixed pilot tip 200 to the aft face 220, thereby removing excess heat from the aft face 220. Gaseous fuel from the gaseous fuel plenum 214 is conveyed through fuel injection ports 254 defined through the intermediate shroud 204 and into tubes 250 that extend between a forward face 210 and an aft face 220 of the premixed pilot tip 200. The tubes 250 have tube inlets 252 around the perimeter of the forward face 210 and tube outlets (not shown) around the perimeter of the aft face 220. A recessed area 222 is formed on the aft face 220 radially inward of the tube outlets to promote flame stabilization, while keeping the aft face 200 cool. As shown in FIG. 8, the tubes 250 wrap helically around the longitudinal axis of the premixed pilot tip 200, and the tube outlets (not shown) direct the exiting fuel/air mixture in a tangential direction relative to the longitudinal axis of the premixed pilot nozzle tip 200.

The liquid fuel cartridge 280 includes an elongate conduit 282 that is coupled to a source of liquid fuel and that extends through the inner shroud 206. A conical tip portion 286 is positioned at the aft end of the elongate conduit 282, and a liquid fuel plenum 284 defined within the elongate conduit 282 and the conical tip portion 286. The liquid fuel flows out of a liquid fuel outlet 288 disposed axially upstream of the aft face 220.

A water plenum 218, coupled to a source of water, is disposed between the inner shroud 206 and the liquid fuel cartridge 280 to reduce the temperature of the liquid fuel conduit 282 and, thereby, to reduce the likelihood of coking. Water flows through perforations 272 in a perimeter band 270 that secures the position of the liquid fuel cartridge 280. After the water flows through a region 276 downstream of the perimeter band 270, the water reaches an outlet 278, where the water mixes with the liquid fuel.

The terminology used herein is to describe particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described step or event may or may not occur and that the description includes instances where the step or event occurs and instances where it does not.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the present concentricity measurement system and method and their practical application and to enable others of ordinary skill in the art to understand the disclosure of various embodiments with various modifications as are suited to the particular use contemplated.

What is claimed is:

1. A premixed pilot nozzle comprising:
    a center body; and
    a nozzle tip comprising:
    axially elongated tubes defined at least partially by an outer shroud and a first shroud disposed radially inward of the outer shroud, each of the tubes extending between a tube inlet defined through a forward face of the nozzle tip and a tube outlet defined through an aft face of the nozzle tip of the premixed pilot nozzle, the respective tube inlets being circumferentially arranged on the forward face of the nozzle tip, wherein each tube inlet has a circular shape, and each tube outlet has an elliptical shape, and wherein the outer shroud extends axially from a terminal end of the center body and is attached to the terminal end of the center body at the forward face such that the forward face abuts the terminal end of the center body;
    a second shroud disposed radially inward of the first shroud, such that a fuel plenum is defined between the first shroud and the second shroud, the fuel plenum being in communication with a gaseous fuel supply;
    a fuel injection port defined through each of the tubes at a position axially between the tube inlet and the tube outlet of each of the tubes, the fuel injection port being in fluid communication with the fuel plenum through the first shroud; and
    an air supply configured to fluidly communicate with the tube inlet of each of the tubes;
    wherein the second shroud defines a plenum therein, the plenum being coupled to a source of a non-combustible fluid;
    wherein the aft face defines a recessed area, the recessed area having a planar surface parallel to, and radially inward of, a portion of the aft face in which the tube outlets are defined.

2. The premixed pilot nozzle of claim 1, wherein each tube of the axially elongated tubes has a helical portion, such that the tube inlet of each respective tube is circumferentially offset from the tube outlet of each respective tube, and a mixture of fuel and air exiting through the respective tube outlets flows in a tangential direction relative to a longitudinal axis of the premixed pilot nozzle.

3. The premixed pilot nozzle of claim 1, wherein the non-combustible fluid is air.

4. The premixed pilot nozzle of claim 3, further comprising a dummy cartridge insert disposed at an aft end of the second shroud, the dummy cartridge insert comprising a bulbous body defining an air cavity therein, a conical portion in fluid communication with the air cavity, and an air outlet in fluid communication with the conical portion, the air outlet being axially upstream of the aft face.

5. The premixed pilot nozzle of claim 4, further comprising a perimeter band disposed between the second shroud and the bulbous body of the dummy cartridge insert; wherein the perimeter band defines therethrough a plurality of apertures in fluid communication with the plenum.

6. The premixed pilot nozzle of claim 1, wherein the non-combustible fluid is water.

7. The premixed pilot nozzle of claim 6, further comprising a liquid fuel cartridge disposed radially inward of the second shroud and extending through the plenum.

8. The premixed pilot nozzle of claim 7, wherein the liquid fuel cartridge comprises an elongate conduit defining a liquid fuel plenum, a conical portion in fluid communication with the liquid fuel plenum, and a liquid fuel outlet in fluid communication with the conical portion, the liquid fuel outlet being axially upstream of the aft face.

9. The premixed pilot nozzle of claim 7, further comprising a perimeter band disposed between the second shroud and the liquid fuel cartridge; wherein the perimeter band defines therethrough a plurality of apertures in fluid communication with the plenum.

10. The premixed pilot nozzle of claim 1, further comprising a plurality of fuel injection pegs circumferentially arranged about the center body, the plurality of fuel injection pegs being disposed axially upstream of the forward face.

11. The premixed pilot nozzle of claim 1, wherein the outer shroud defines an outermost surface of the premixed pilot nozzle.

12. A combustor for a gas turbine, the combustor comprising:
a head end comprising an end cover, a cap assembly axially separated from the end cover, and a premixed pilot nozzle disposed between the end cover and the cap assembly, the premixed pilot nozzle comprising:
a center body; and
a nozzle tip comprising:
axially elongated tubes defined at least partially by an outer shroud and a first shroud disposed radially inward of the outer shroud, each of the tubes extending between a tube inlet defined through a forward face of the nozzle tip and a tube outlet defined through an aft face of the nozzle tip of the premixed pilot nozzle, the respective tube inlets being circumferentially arranged on the forward face of the nozzle tip, wherein each tube inlet has a circular shape, and each tube outlet has an elliptical shape, and wherein the outer shroud extends axially from a terminal end of the center body and is attached to the terminal end of the center body at the forward face such that the forward face abuts the terminal end of the center body;
a second shroud disposed radially inward of the first shroud, such that a fuel plenum is defined between the first shroud and the second shroud, the fuel plenum being in communication with a gaseous fuel supply;
a fuel injection port defined through each of the tubes at a position axially between the tube inlet and the tube outlet of each of the tubes, the fuel injection port being in fluid communication with the fuel plenum through the first shroud; and
an air supply configured to fluidly communicate with the tube inlet of each of the tubes;
wherein the second shroud defines a plenum therein, the plenum being coupled to a source of a non-combustible fluid; and
wherein the aft face defines a recessed area, the recessed area having a planar surface parallel to, and radially inward of, a portion of the aft face in which the tube outlets are defined.

13. The combustor of claim 12, wherein each tube of the axially elongated tubes has a helical portion, such that the tube inlet of each respective tube is circumferentially offset from the tube outlet of each respective tube, and a mixture of fuel and air exiting through the respective tube outlets flows in a tangential direction relative to a longitudinal axis of the premixed pilot nozzle.

14. The combustor of claim 12, wherein the non-combustible fluid is air.

15. The combustor of claim 14, further comprising a dummy cartridge insert disposed at an aft end of the second shroud, the dummy cartridge insert comprising a bulbous body defining an air cavity therein, a conical portion in fluid communication with the air cavity, and an air outlet in fluid communication with the conical portion, the air outlet being axially upstream of the aft face.

16. The combustor of claim 15, further comprising a perimeter band disposed between the second shroud and the bulbous body of the dummy cartridge insert; wherein the perimeter band defines therethrough a plurality of apertures in fluid communication with the plenum.

17. The combustor of claim 12, wherein the non-combustible fluid is water.

18. The combustor of claim 17, further comprising a liquid fuel cartridge disposed radially inward of the second shroud and extending through the plenum.

19. The premixed pilot nozzle of claim 18, wherein the liquid fuel cartridge comprises an elongate conduit defining a liquid fuel plenum, a conical portion in fluid communication with the liquid fuel plenum, and a liquid fuel outlet in fluid communication with the conical portion, the liquid fuel outlet being axially upstream of the aft face.

* * * * *